US009221484B2

(12) United States Patent
Logvin et al.

(10) Patent No.: US 9,221,484 B2
(45) Date of Patent: Dec. 29, 2015

(54) CONFIGURABLE CART (71) Applicants: Eric W. Logvin, Scottsdale, AZ (US);
Brandon Law, Altadena, CA (US);
Sergio Landau, Laguna Hills, CA (US)

(72) Inventors: Eric W. Logvin, Scottsdale, AZ (US);
Brandon Law, Altadena, CA (US);
Sergio Landau, Laguna Hills, CA (US)

( * ) Notice: Subject to any disclaimer, the term of this patent is extended or adjusted under 35 U.S.C. 154(b) by 0 days.

(21) Appl. No.: 14/169,138

(22) Filed: Jan. 30, 2014

(65) Prior Publication Data
US 2014/0300069 A1 Oct. 9, 2014

Related U.S. Application Data (60) Provisional application No. 61/807,756, filed on Apr. 3, 2013.

(51) Int. Cl.
*B62B 3/02* (2006.01)

(52) U.S. Cl.
CPC .......................................... *B62B 3/02* (2013.01)

(58) Field of Classification Search
CPC ........ B62B 3/02; B62B 1/12; B62B 2204/04; B62B 2206/02; B62B 2206/04
See application file for complete search history.

(56) References Cited

U.S. PATENT DOCUMENTS

| 3,873,114 | A | * | 3/1975 | Brown | 280/30 |
| 3,908,562 | A | * | 9/1975 | Wittschen | 280/79.11 |
| 4,505,495 | A | * | 3/1985 | Foss et al. | 280/651 |
| 5,425,545 | A | * | 6/1995 | McCusker | 280/30 |
| 5,464,236 | A | * | 11/1995 | Benting et al. | 280/30 |
| 6,079,777 | A | * | 6/2000 | Simmons et al. | 297/217.1 |
| 6,311,991 | B1 | * | 11/2001 | Conrado et al. | 280/47.26 |
| 6,431,319 | B1 | * | 8/2002 | Myers et al. | 187/243 |
| 6,471,236 | B1 | * | 10/2002 | Eskridge | 280/648 |
| 6,536,796 | B1 | * | 3/2003 | Solomon | 280/651 |
| 6,581,945 | B1 | * | 6/2003 | Shapiro | 280/30 |
| 7,097,182 | B1 | * | 8/2006 | Liu | 280/42 |
| 7,306,243 | B2 | * | 12/2007 | Van Horn et al. | 280/30 |
| 7,387,305 | B2 | * | 6/2008 | Vanderberg et al. | 280/47.26 |
| 7,458,589 | B2 | * | 12/2008 | Vanderberg et al. | 280/47.26 |
| 7,458,590 | B2 | * | 12/2008 | Vanderberg et al. | 280/47.26 |
| 7,458,591 | B2 | * | 12/2008 | Vanderberg et al. | 280/47.26 |
| 7,513,510 | B2 | * | 4/2009 | Vanderberg et al. | 280/47.26 |
| 7,513,511 | B2 | * | 4/2009 | Chaseateau | 280/47.27 |
| 7,543,828 | B2 | * | 6/2009 | Vanderberg et al. | 280/47.26 |
| 7,549,653 | B2 | * | 6/2009 | Vanderberg et al. | 280/47.26 |
| 7,559,559 | B2 | * | 7/2009 | Vanderberg et al. | 280/47.26 |
| 7,677,580 | B2 | * | 3/2010 | Vanderberg et al. | 280/47.18 |
| 7,677,581 | B2 | * | 3/2010 | Vanderberg et al. | 280/47.26 |
| 7,731,221 | B2 | * | 6/2010 | Bess | 280/651 |
| 8,066,301 | B1 | * | 11/2011 | Westermann | 280/657 |
| 8,070,180 | B2 | * | 12/2011 | Stiba | 280/648 |
| 8,424,901 | B2 | * | 4/2013 | Vanderberg et al. | 280/655.1 |

(Continued)

*Primary Examiner* — Hau Phan
*Assistant Examiner* — Jacob Meyer (57) ABSTRACT

This invention includes a cart assembly with an integrated cooler and a configurable and expandable cargo platform. The cart assembly comprises a chest compartment. One end of support beams is attached to the front surface of the chest. The opposite ends of the support beams are attached to the rear surface of the extension member. One end of an expanding platform is attached to the front surface of the chest. The opposite end of the expanding platform is attached to the rear surface of the extension member. Ends of the telescoping support rails are attached on both the left and right sides of the chest. Opposite ends of the telescoping support rails are attached on both the left and right side of the extension member. The cart assembly can expand and collapse to accommodate larger or smaller cargos and reconfigure the platform into a table.

19 Claims, 12 Drawing Sheets

(56) References Cited

U.S. PATENT DOCUMENTS

| | | | |
|---|---|---|---|
| 8,540,273 B2* | 9/2013 | Dobrachinski | 280/651 |
| 8,544,872 B2* | 10/2013 | Vanderberg et al. | 280/655.1 |
| 8,668,223 B2* | 3/2014 | Vanderberg et al. | 280/655.1 |
| 2001/0045718 A1* | 11/2001 | Boirum | 280/47.26 |
| 2002/0158446 A1* | 10/2002 | Stravitz et al. | 280/651 |
| 2003/0085552 A1* | 5/2003 | Shapiro | 280/646 |
| 2004/0000458 A1* | 1/2004 | Weiss et al. | 190/18 A |
| 2005/0230936 A1* | 10/2005 | Van Horn et al. | 280/641 |
| 2006/0237923 A1* | 10/2006 | Vanderberg et al. | 280/35 |
| 2006/0237924 A1* | 10/2006 | Vanderberg et al. | 280/35 |
| 2006/0237925 A1* | 10/2006 | Vanderberg et al. | 280/35 |
| 2006/0237926 A1* | 10/2006 | Vanderberg et al. | 280/35 |
| 2006/0237927 A1* | 10/2006 | Vanderberg et al. | 280/35 |
| 2006/0237928 A1* | 10/2006 | Vanderberg et al. | 280/35 |
| 2007/0001409 A1* | 1/2007 | Kaplan | 280/35 |
| 2008/0073880 A1* | 3/2008 | Bess | 280/651 |
| 2008/0223071 A1* | 9/2008 | Vanderberg et al. | 62/457.7 |
| 2008/0223072 A1* | 9/2008 | Vanderberg et al. | 62/457.7 |
| 2008/0223862 A1* | 9/2008 | Vanderberg et al. | 220/592.03 |
| 2009/0315300 A1* | 12/2009 | Stiba | 280/648 |
| 2010/0154464 A1* | 6/2010 | Vanderberg et al. | 62/457.7 |
| 2010/0219615 A1* | 9/2010 | Forrest et al. | 280/638 |
| 2010/0283227 A1* | 11/2010 | Perelli et al. | 280/639 |
| 2010/0320732 A1* | 12/2010 | Dobrachinski | 280/651 |
| 2011/0115198 A1* | 5/2011 | Dobrachinski | 280/651 |
| 2011/0133417 A1* | 6/2011 | Rouillard et al. | 280/35 |
| 2011/0226003 A1* | 9/2011 | Chaney et al. | 62/457.7 |
| 2013/0001905 A1* | 1/2013 | Vanderberg et al. | 280/47.26 |
| 2013/0049313 A1* | 2/2013 | Vanderberg et al. | 280/47.26 |
| 2013/0193657 A1* | 8/2013 | Vanderberg et al. | 280/47.26 |
| 2013/0193673 A1* | 8/2013 | Vanderberg et al. | 280/655 |
| 2013/0292925 A1* | 11/2013 | Shindelar et al. | 280/651 |
| 2014/0369801 A1* | 12/2014 | Beauchamp et al. | 414/800 |

* cited by examiner

FIG. 3
3000 Cart Assembly
(Mid-Extension Position)

FIG. 4
4000 Cart Assembly
(Tabletop Extending Position)

FIG. 5
5000 Cart Assembly
(Collapsed/Tabletop Extended)

FIG. 12
Accessories

CONFIGURABLE CART

CROSS-REFERENCE TO RELATED APPLICATIONS

This application claims the benefit of U.S. Provisional Application Ser. No. 61/807,756 filed Apr. 3, 2013 all of which is incorporated herein by reference in its entirety.

FIELD OF THE INVENTION

This invention is in the field of configurable carts used to haul cargo over rugged terrain.

BACKGROUND OF THE INVENTION

People have required carts of various types to help carry heavy or cumbersome cargo for work and play. For example, parents often struggle to haul equipment and supplies to the beach, or to their children's sporting activities. Often the locations of these activities include rugged terrains such as sand, gravel, and grass. These activities also typically require toting a cooler to keep refreshments cooled, further complicating the task of hauling the various equipment along with children.

There are many carts available for purchase or already patented. However, all of the known carts lack the flexibility to carry different types, size, and quantity of cargo in an optimum manner. For example, available carts are of a fixed capacity and do not expand to allow for an increased hauling capacity. Existing carts also lack an integrated compartment to cool refreshments and other items that need to be kept cool. Lastly, existing carts are useless once the destination is reached and the cargo is unloaded.

This invention provides a novel cart including a flexible sized cargo space, an integrated cooler, and configurable into different functions, such as a table, once the destination is reached and the cargo is unloaded. Additionally, the cart includes internal and external accessories such as dividing panels integrated into the main unit by a system of channels inside of the chest and external accessories such as an umbrella.

BRIEF SUMMARY OF THE INVENTION

One embodiment of the invention is a cart assembly with an integrated cooler and a configurable and expandable cargo platform. First, the cart assembly comprises a chest compartment. Next, one end of support beams are attached to the front surface of the chest. Next, the opposite ends of the support beams are attached to the rear surface of the extension member. Next, one end of an expanding platform is attached to the front surface of the chest. Next, the opposite end of the expanding platform is attached to the rear surface of the extension member. Next ends of the telescoping support rails are attached on both the left and right sides of the chest at the rear surface of the chest. Next, the opposite ends of the telescoping support rails are attached on both the left and right side of the extension member at the front surface of the extension member. Finally, a person can expand and retract the cart assembly to accommodate larger or smaller cargos, as well as hold cooled items within the insulated chest, and reconfigure the platform into a table when the cargo is unloaded from the platform.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
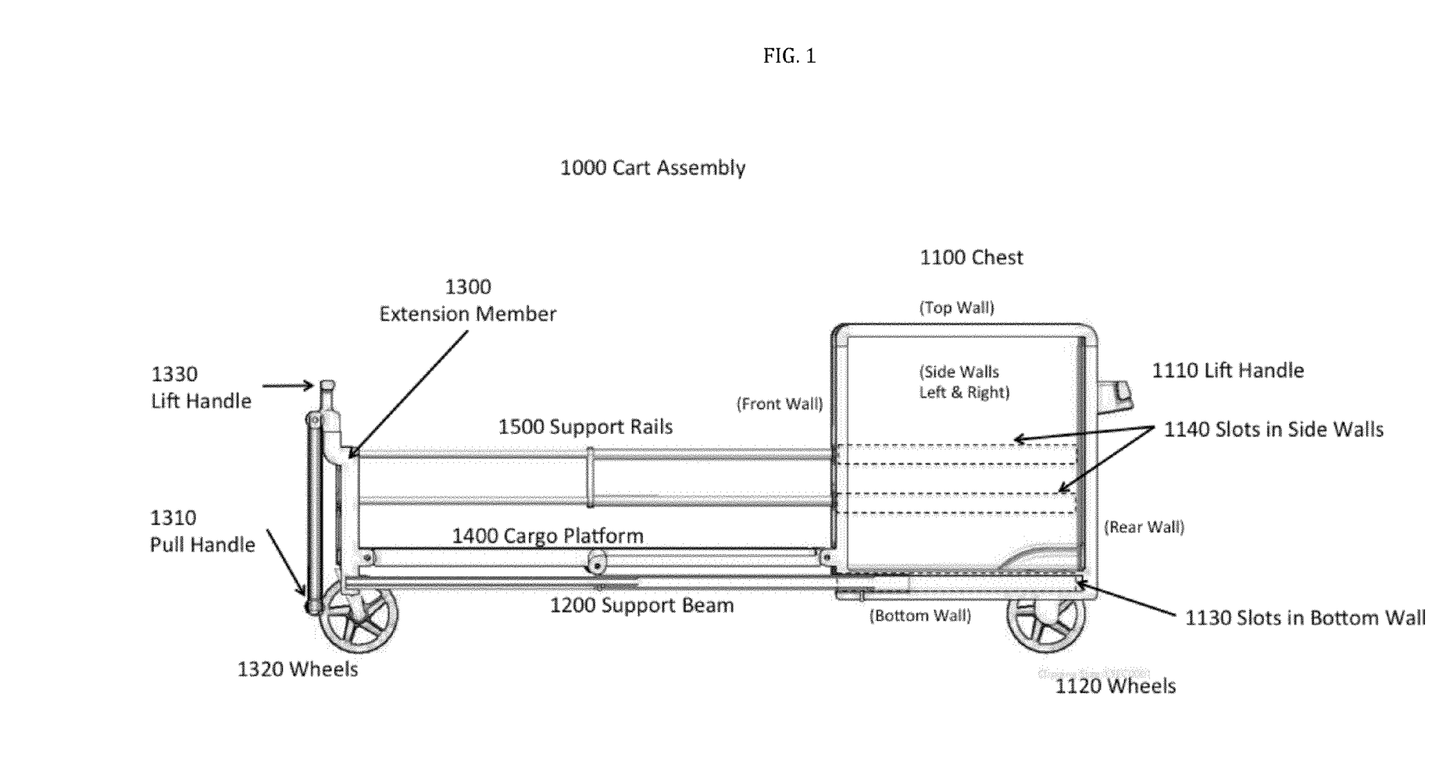
FIG. 1 is a figure illustrating a side view of the cart assembly with the cargo platform in the extended position in accordance with the teachings of the present invention.

FIG. 1 illustrates a configurable cart assembly 1000 with a chest 1100 and a configurable and expandable cargo platform 1400. First, the cart assembly 1000 comprises a chest 1100. The chest 1100 may take on any geometric shape. An ideal shape may include a square or rectangular box shape. The chest 1100 includes a front, rear, right, left, and bottom walls configured to create at least one storage compartment. These walls are designed to form the square or rectangular box shape. For example, the walls have a width, length, and thickness. The walls are also joined at the edges to form the box shape shown in FIGS. 1-7. The walls (including the front, rear, right, left, bottom, and top walls) may be made from insulating materials such as wood, foam, plastic, or any other insulating material suitable to structurally support the chest 1100 and insulate the inside of the chest 1100 from the environment.

The chest 1100 also includes a top wall that is attached by a hinge to the front wall to form a lid that covers the storage compartment. The chest compartment also includes at least one lift handle 1110 on at least one of the exterior sides of the rear, right, or left walls that is designed to serve as a lifting handle. The lifting handle 1110 is designed such that a person can use the lifting handle 1110 to pick up the cart assembly 1100.

Figure 2:
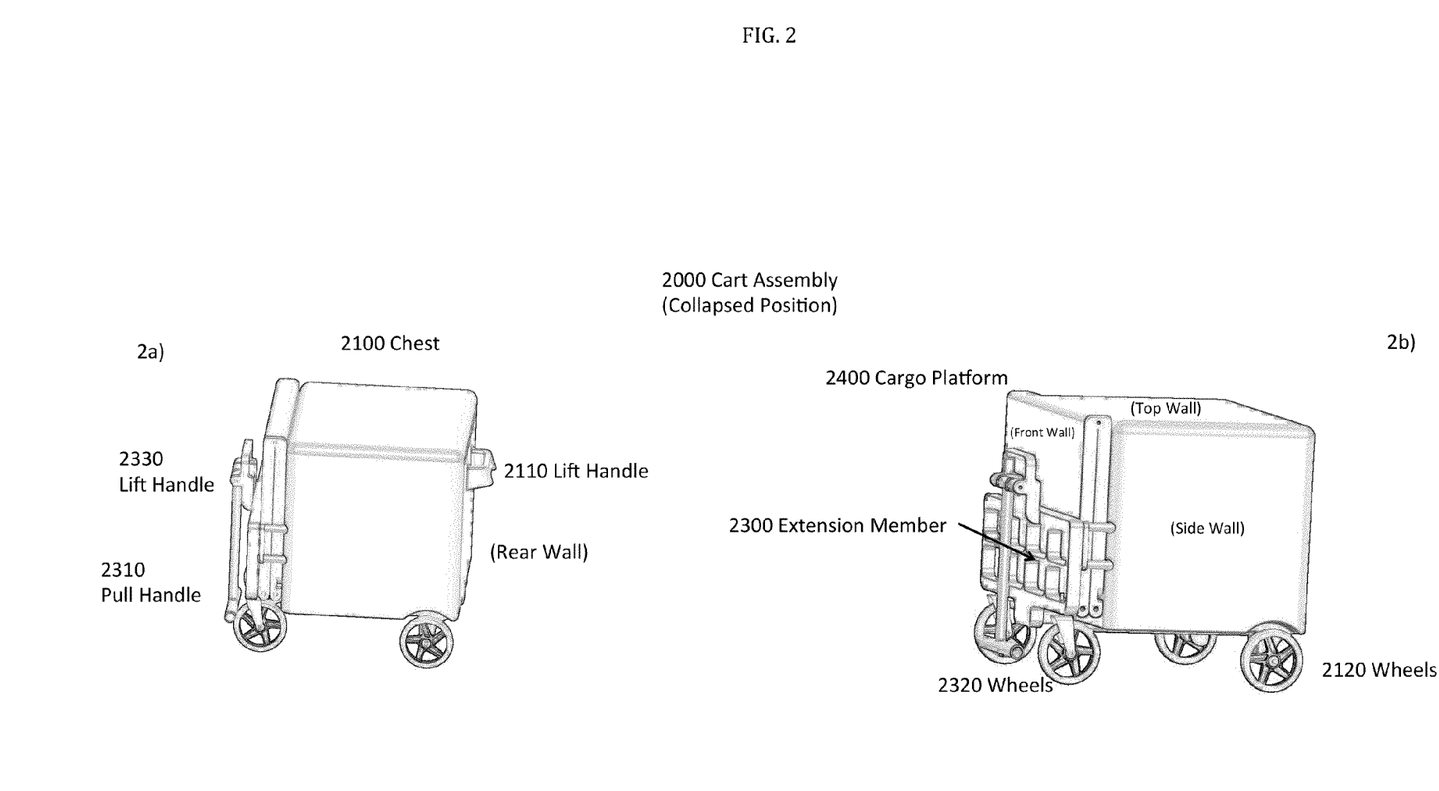
FIG. 2 is a figure illustrating the cart assembly with the cargo platform in the collapsed position in accordance with the teachings of the present invention.

The right and left walls also include slots 1140 that interface with the telescoping support rails 1500. FIG. 1 illustrates how the telescoping support rails 1500 are coupled to the chest 1100 via the right and left walls. The telescoping support rails 1500 are inserted into the slots 1140 in such a manner that the majority of the telescoping support rails 1500 can be stowed inside of the slots 1140 when the cargo platform 1400 is in the retracted position, as shown in FIG. 2. The telescoping support rails 1500 are allowed to slide freely within the slots 1140, but they are not allowed to separate from the chest 1100. For example, the telescoping support rails 1500 are prevented from falling out of the slots 1140 with fasteners, such as pins or screws.

At least two wheels 1120 are attached to the bottom wall of the chest 1100 providing the mechanical leverage to easily pull the cart assembly 1000 when loaded with cargo. The wheels 1120 are optimally sized and made of appropriate materials to haul different types and sizes of cargo. For example, the wheels 1120 can be made of steel or other structural metals for heavier loads, or wood or plastic for lighter loads. The wheels 1120 could also include solid rubber, solid plastic, or pneumatic tires. The load capacity can also be enhanced with high load capacity bearings. In fact, many different configurations can be created to accommodate different requirements such as load capacity, size, weight, and cost.

Figure 7:
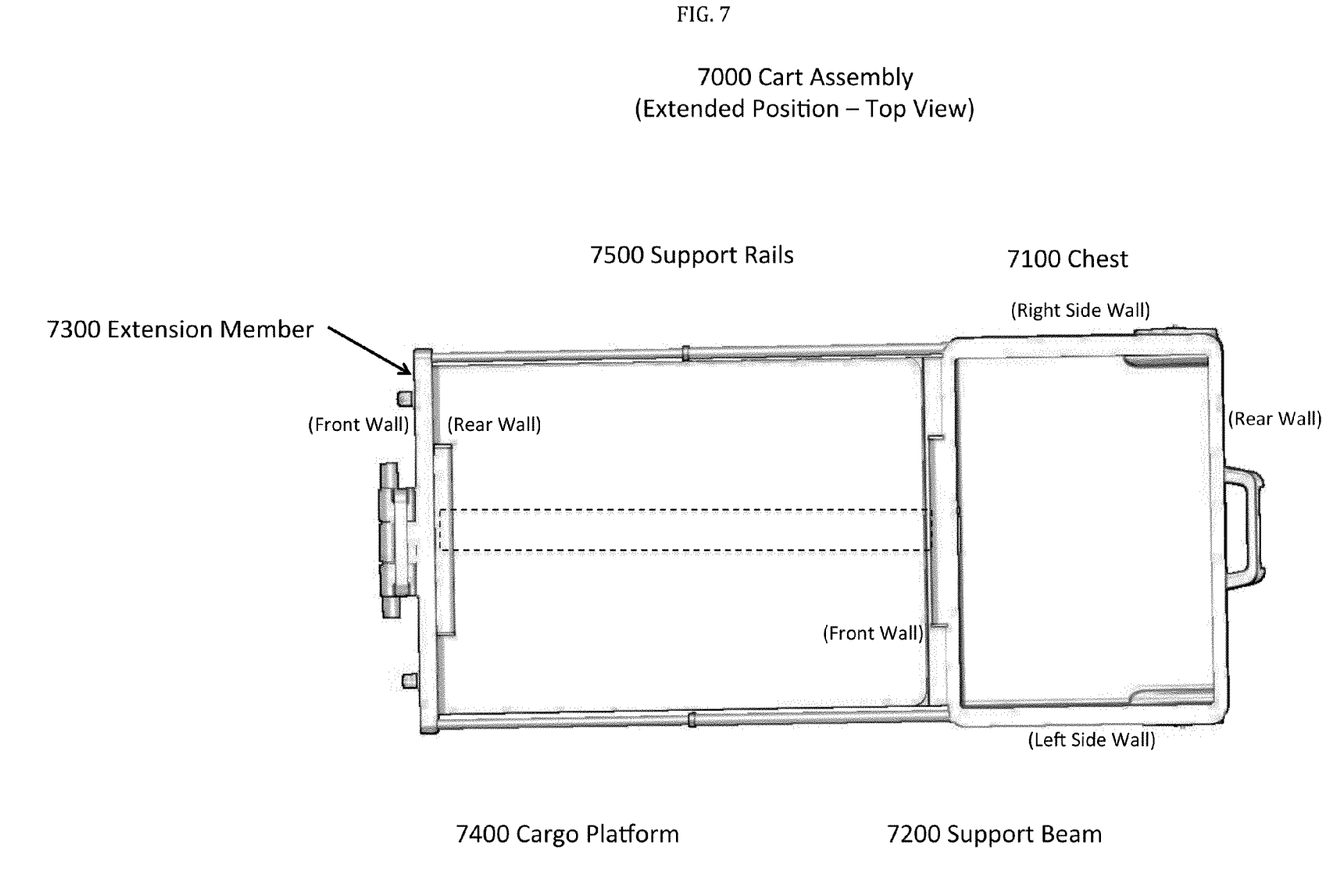
FIG. 7 is a figure illustrating a top view of the cart assembly in the extended position in accordance with the teachings of the present invention.

Next, at least one telescoping support beam 1200 is coupled to the chest 1100. The opposite ends of the telescoping support beams 1200 are attached to the rear surface of the extension member 1300. For example FIG. 1 illustrates the invention with one telescoping support beam 1200 placed at the center of the cart assembly, as shown in FIG. 7, to optimize the load carrying capacity. One end of the telescoping support beam 1200 is coupled to the exterior surface of the chest's 1100 front wall. The chest's 1100 bottom wall includes a slot 1130 that interfaces with the telescoping support beam 1200. FIG. 1. illustrates how the telescoping support beam 1200 is coupled to the chest 1100 via the bottom wall. The telescoping support beam 1200 is inserted into the slot 1130 in such a manner that the majority of the telescoping support beam 1200 can be stowed inside of the slot 1130 when the cargo platform 1400 is in the retracted position, as shown in FIG. 2. The telescoping support beam 1200 is allowed to slide freely within the slot 1130, but it is not allowed to separate from the chest 1100. For example, the telescoping support beam 1200 is prevented from falling out of the slot 1130 with fasteners, such as pins or screws. The opposite end of the telescoping support beam 1200 is fixed to the rear surface of the extension member 1300 near the bottom of the extension member 1300.

The telescoping support beam 1200 is comprised of at least two members with similar cross sectional geometry, but with each member having a different geometric size. The telescoping support beam 1200 members are prevented from separating by use of fasteners such as pins or screws.

The cross section of the members may be comprised from several types of geometries including circular, rectangular, or C-shaped tubes. The members are also comprised of hollow tubes, such that the smaller sized member can be collapsed within the hollow section of the larger sized members. It may also be feasible to make the smallest sized member from a solid cross section to enhance its load carrying capacity and minimize its size. The telescoping support beam 1200 members may be made out of metal, plastics, or any material able to support the expected loads of the cargo and enable the members to collapse upon each other in a telescoping manner. The overall size of the telescoping support beam 1200 members is designed to collapse within the slot of the bottom wall of the chest 1100 and to expand long enough to support the cargo platform 1400 when the cargo platform 1400 is in the fully expanded configuration.

Next, one end of an expanding cargo platform 1400 is attached to the front surface of the chest 1100. The opposite end of the expanding cargo platform 1400 is attached to the rear surface of the extension member 1300. The expanding cargo platform 1400 is comprised of at least two plates. The expanding cargo platform 1400 is designed to be the about the same width as the chest 1100, the actual width may be narrower than the chest 1100 to enable the Supporting Rails 1500 to fold into the collapsed position, as shown in FIG. 2. The length of the expanding cargo platform 1400 is designed to match the desired maximum cargo capacity. The length of each plate is approximately half the length of the expanding cargo platform 1400. One end of the first plate is attached by a hinge to the front surface of the chest 1100. The opposite end of the first plate is attached by a hinge to one end of the second plate. The opposite end of the second plate is attached by a hinge to the rear surface of the extension member 1300.

Figure 3:
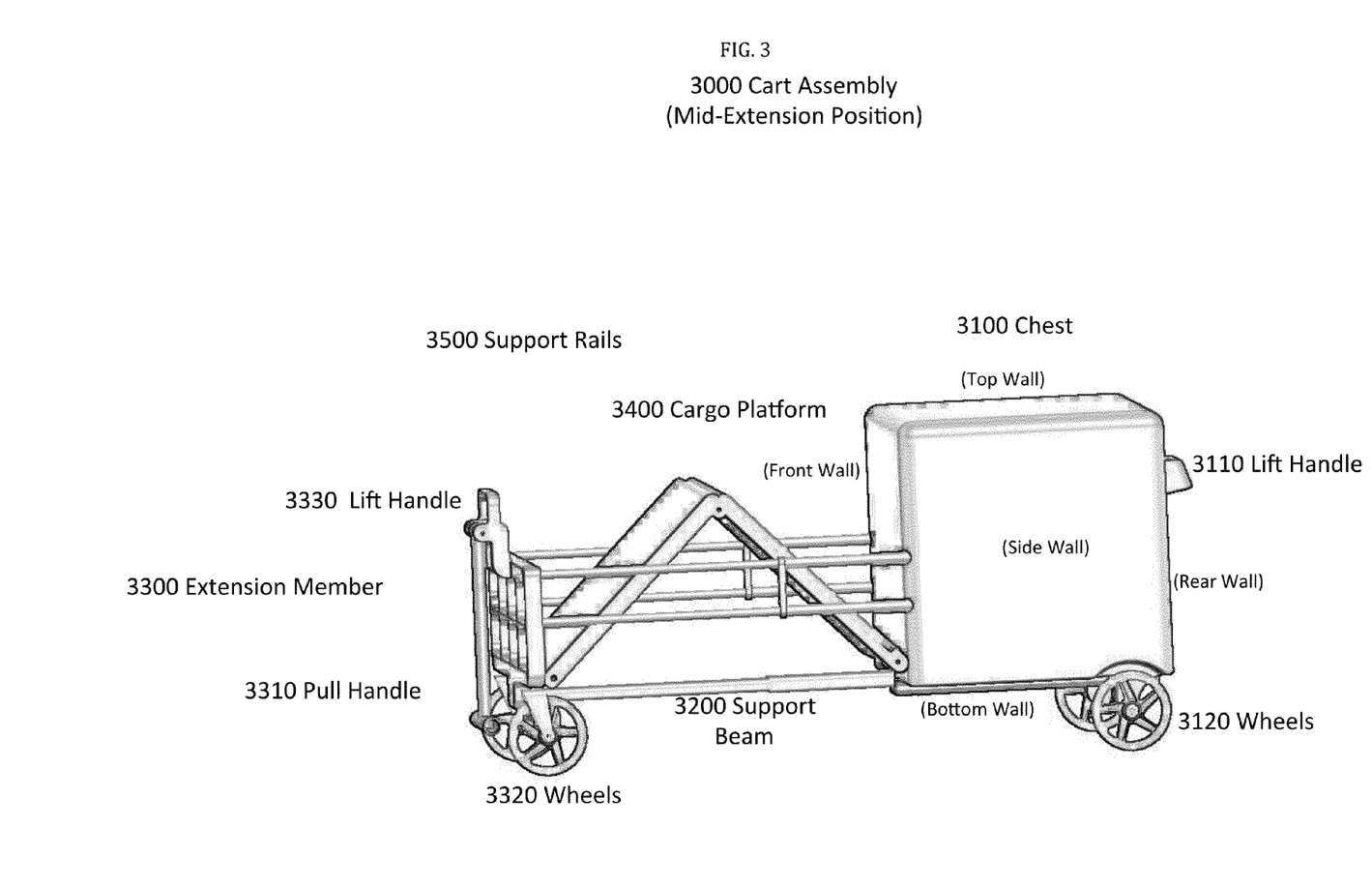
FIG. 3 is a figure illustrating the cart assembly with the cargo platform being extended, i.e. the cargo assembly is in the mid-extension position, in accordance with the teachings of the present invention.

As shown in FIG. 3, the plates are coupled to the chest 3100 and extension member 3300 in such a way that the plates will fold in an accordion style, when the extension member 3300 is pushed toward the chest 3100. The plates will also unfold when the extension member 3300 is pulled away from the chest 3100 to form the cargo platform 3400. The plates will stop unfolding when they touch the telescoping support beam 3200, which is also telescoping out when the extension member 3300 is pulled away from the chest 3100.

Figure 4:
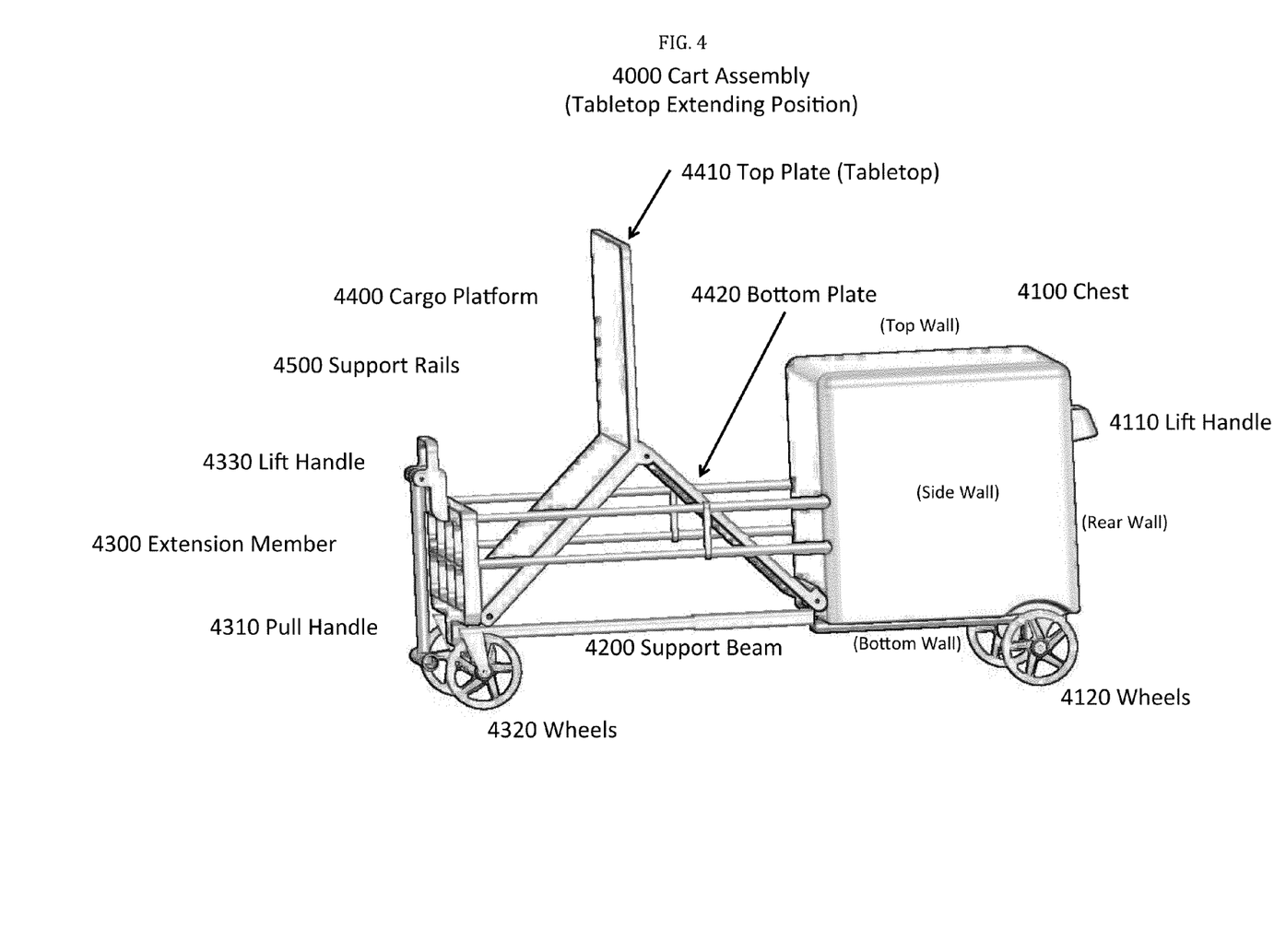
FIG. 4 is a figure illustrating the cart assembly with the tabletop being extended in accordance with the teachings of the present invention.
Figure 5:
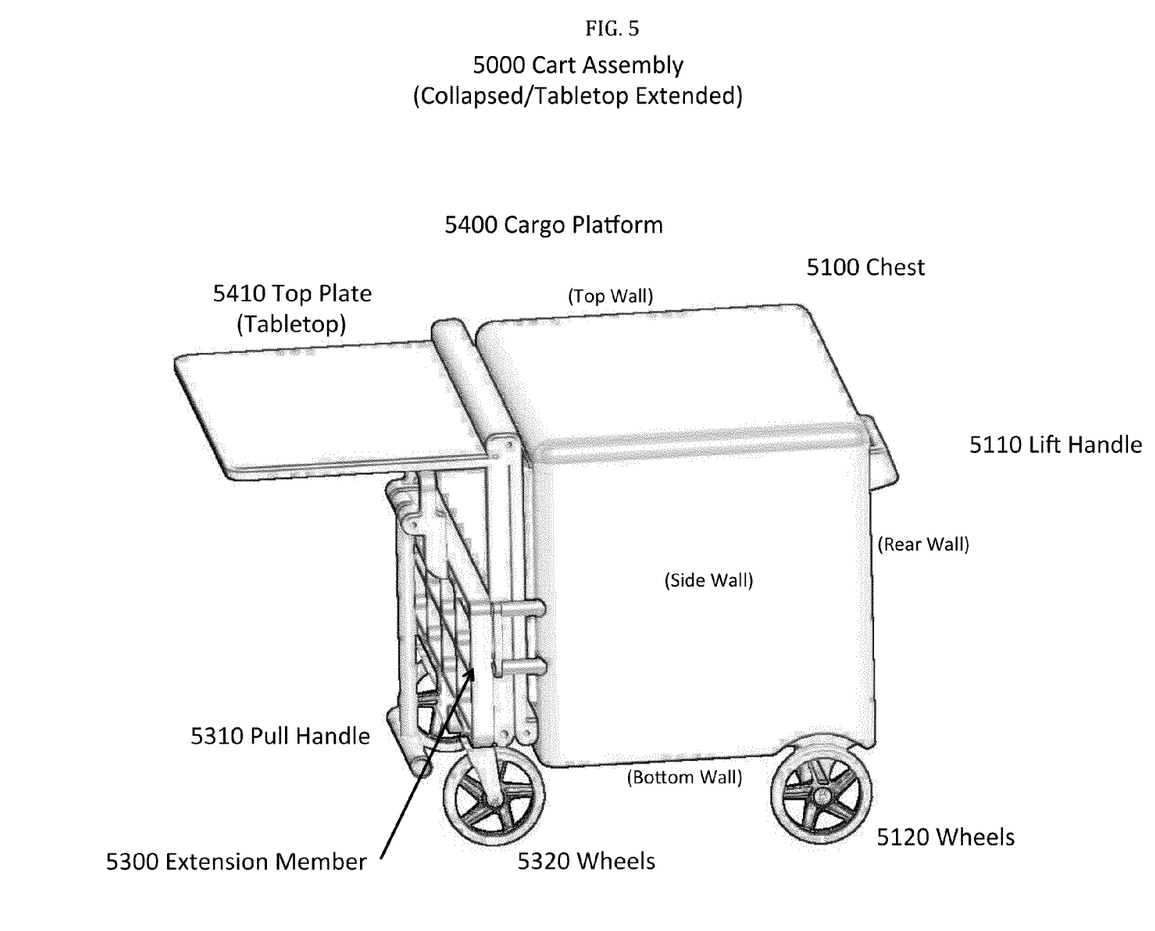
FIG. 5 is a figure illustrating the cart assembly in the collapsed position and with the tabletop extended in accordance with the teachings of the present invention.

Now referring to FIG. 4., the first plate, i.e. the plate attached to the chest 4100, is further comprised of a bottom plate 4420 and top plate 4410 hinged together toward the edge opposite the chest 4100. The opposite ends of the bottom plate 4420 and top plate 4410 are not attached to each other. The free end of the top plate 4410 is able to rotate at least 180 degrees away from the bottom plate 4420 to form a tabletop when the cart is unloaded and in the collapsed position, as shown in FIG. 5. The combined thickness of the lower and upper plate is approximately the same as the thickness of the second plate.

The plates comprising the expanding cargo platform may be made out of metal, plastics, or any material able to support the expected loads of the cargo and enable the members to fold and unfold upon each other as shown in FIGS. 1-7.

Again referring to FIG. 1, ends of the telescoping support rails 1500 are attached on both the left and right side walls of the chest 1100 at the rear surface of the chest 1100. The opposite ends of the telescoping support rails 1500 are attached on both the left and right side of the extension member 1300 at the front surface of the extension member 1300. Any number of telescoping support rails 1500 may be used to provide lateral (side-to-side) support to the cargo carried in the cart assembly 1000.

One end of the telescoping support rails 1500 is coupled to the exterior surface of the chest's 1100 front wall. The chest's 1100 sidewalls include slots 1400 that interface with the telescoping support rails 1500. FIG. 1. illustrates how the telescoping support rails 1500 are coupled to the chest 1100 via the chest's side walls. The telescoping support rails 1500 are inserted into the slots 1140 in such a manner that the majority of the telescoping support rails 1500 are stowed inside of the slots 1140 when the cargo platform 1400 is in the collapsed position, as shown in FIG. 2. The telescoping support rails 1500 are allowed to slide freely within the slots 1140, but are not allowed to separate from the chest 1100. For example, the telescoping support rails 1500 are prevented from falling out of the slots 1140 with fasteners, such as pins or screws. The opposite end of the telescoping support rails 1500 are fixed to the rear surface of the extension member 1300.

The telescoping support rails 1500 are comprised of at least two members with similar cross sectional geometry, but with each member having a different geometric size. The telescoping support rail 1500 members are prevented from separating by use of fasteners such as pins or screws.

The cross section of the telescoping support rail 1500 members may be comprised from several types of geometries including circular, rectangular, or C-shaped tubes. The members are also comprised of hollow tubes, such that the smaller sized member can be collapsed within the hollow section of the larger sized members. It may also be feasible to make the smallest sized member from a solid cross section to enhance its load carrying capacity and minimize its size. The telescoping support rail 1500 members may be made out of metal, plastics, or any material able to support the expected lateral loads of the cargo and still enable the members to collapse upon each other in a telescoping manner. The overall size of the telescoping support rails 1500 are designed to collapse within the slots 1140 in the side walls of the chest 1100 and to expand long enough to match the length of the cargo platform 1400 when the platform is in the fully expanded configuration. The telescoping support rails 1500 are also designed such that they extend when the user pulls the extension member 1300 away from the chest 1100, and collapse when the user pushes the extension member 1300 toward the chest 1100. The telescoping support rails 1500 may also include locking features to hold the members in the extended or collapsed positions.

The extension member 1300 is attached to the other end of the telescoping support beams 1500 and telescoping support rails 1500. The extension member 1300 comprises a front, rear, bottom, top, left, and right surface. FIGS. 1-7 show a simple version where the extension member 1300 is fabricated from a mostly solid piece of material—note that there are openings extruded from the front to rear surface to reduce the weight of the extension member 1300 and reduce fabrication costs. In other embodiments, the extension member 1300 may include storage compartments, or also be similar in construction to the chest 1100 (i.e a bottom and 4 side walls, plus a lid—or lidless).

The extension member 1300 may also include at least one wheel 1320 attached to the bottom surface of the extension member 1300. Alternatively the wheels may be replaced with simple posts that hold the extension member 1300 in the proper position. The extension member 1300 also includes a pull handle 1310 and lift handle 1330 attached to the front surface of the extension member 1300. The pull handle 1310 may be used to extend and collapse the expanding cargo platform 1400 when the extension member 1300 is moved away or toward the chest 1100. The pull handle 1310 is also used to pull the cart assembly 1000. The extension member 1300 also includes a lift handle 1330 on the top surface of the extension member 1300, which is used to lift the cart assembly 1100, as well as used to rest the top plate 5410 when the tabletop is deployed, as shown in FIG. 5.

Figure 6:
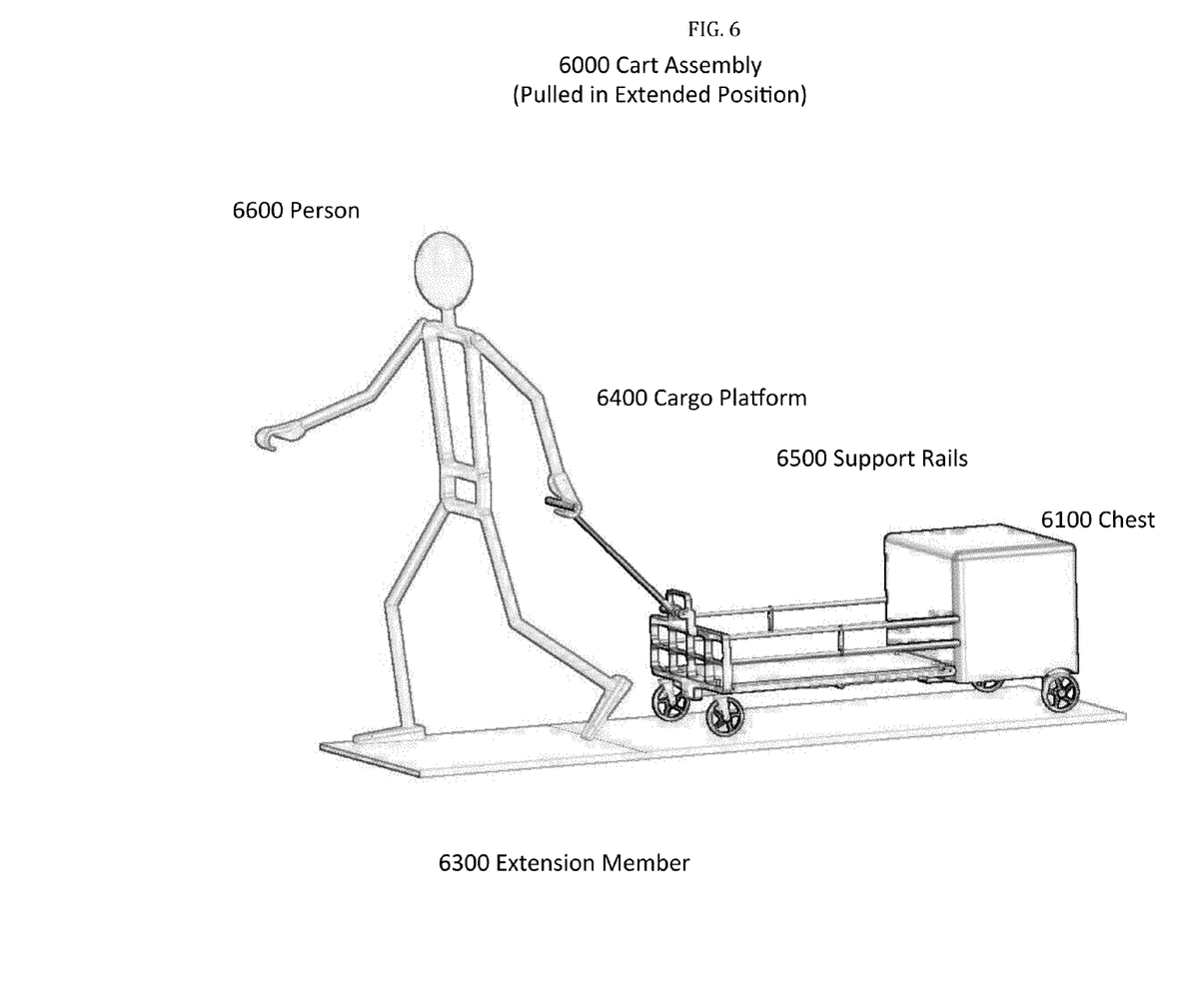
FIG. 6 is a figure illustrating a person pulling the cart assembly in the extended position in accordance with the teachings of the present invention.

Finally, as shown in FIG. 6, a person 6600 can expand and retract the cart assembly to accommodate larger or smaller cargos, as well as hold cooled items within the insulated chest 6100, and reconfigure the cargo platform 6400 into a table when the cargo is unloaded from the platform.

Figure 8:
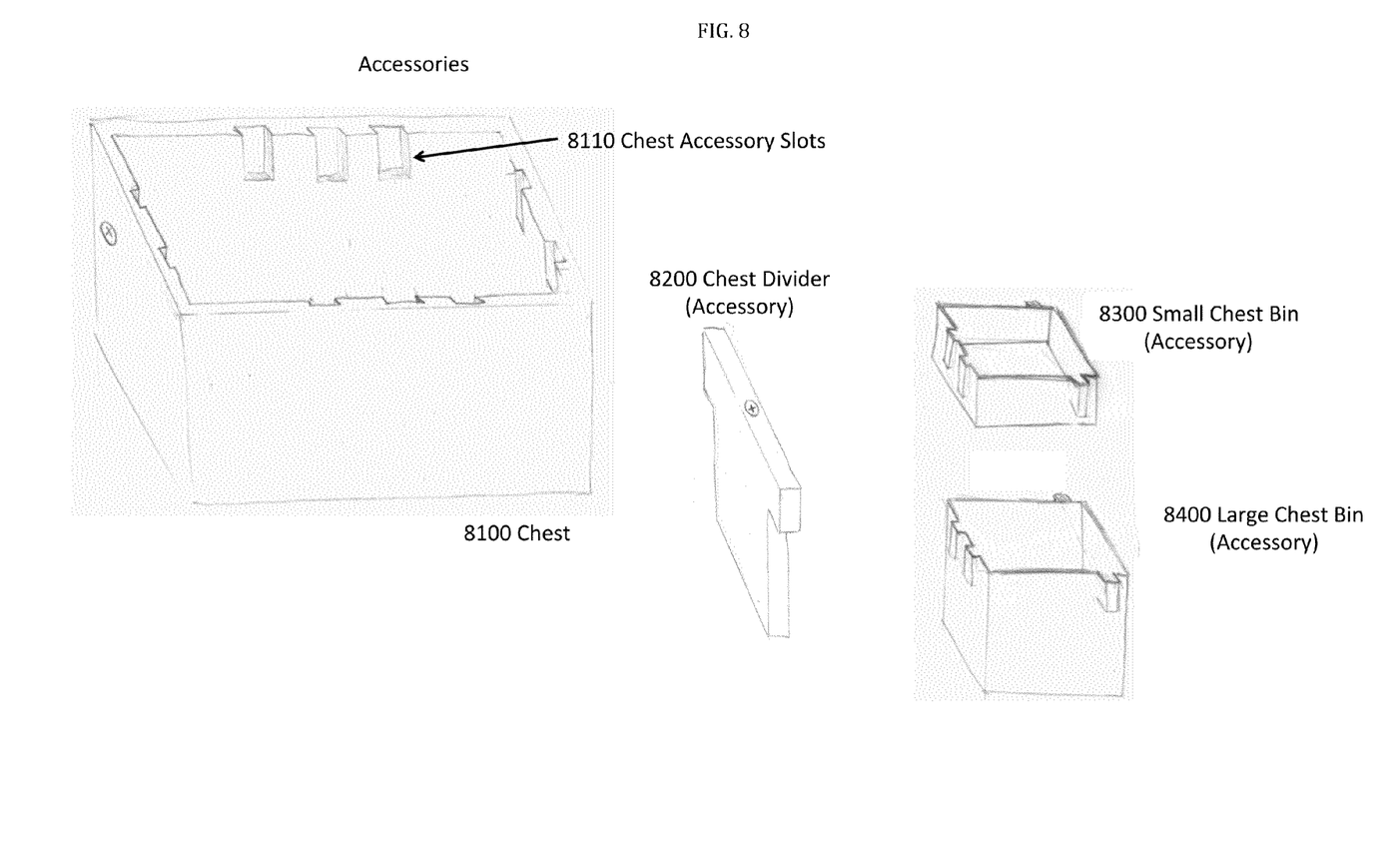
FIG. 8 is a figure illustrating accessories in accordance with the teachings of the present invention.

The cart assembly may also include accessories. FIG. 8 shows the chest 8100 with accessory slots 8110 on the inside surface of the chest sidewalls. Chest dividers 8200 may be used to separate the chest compartment into several isolated vertical compartments. Small chest bins 8300 or large chest bins 8400 may also be used to separate the chest into several isolated horizontal compartments. The accessories include features designed to interface with the accessory slots 8110.

Figure 9:
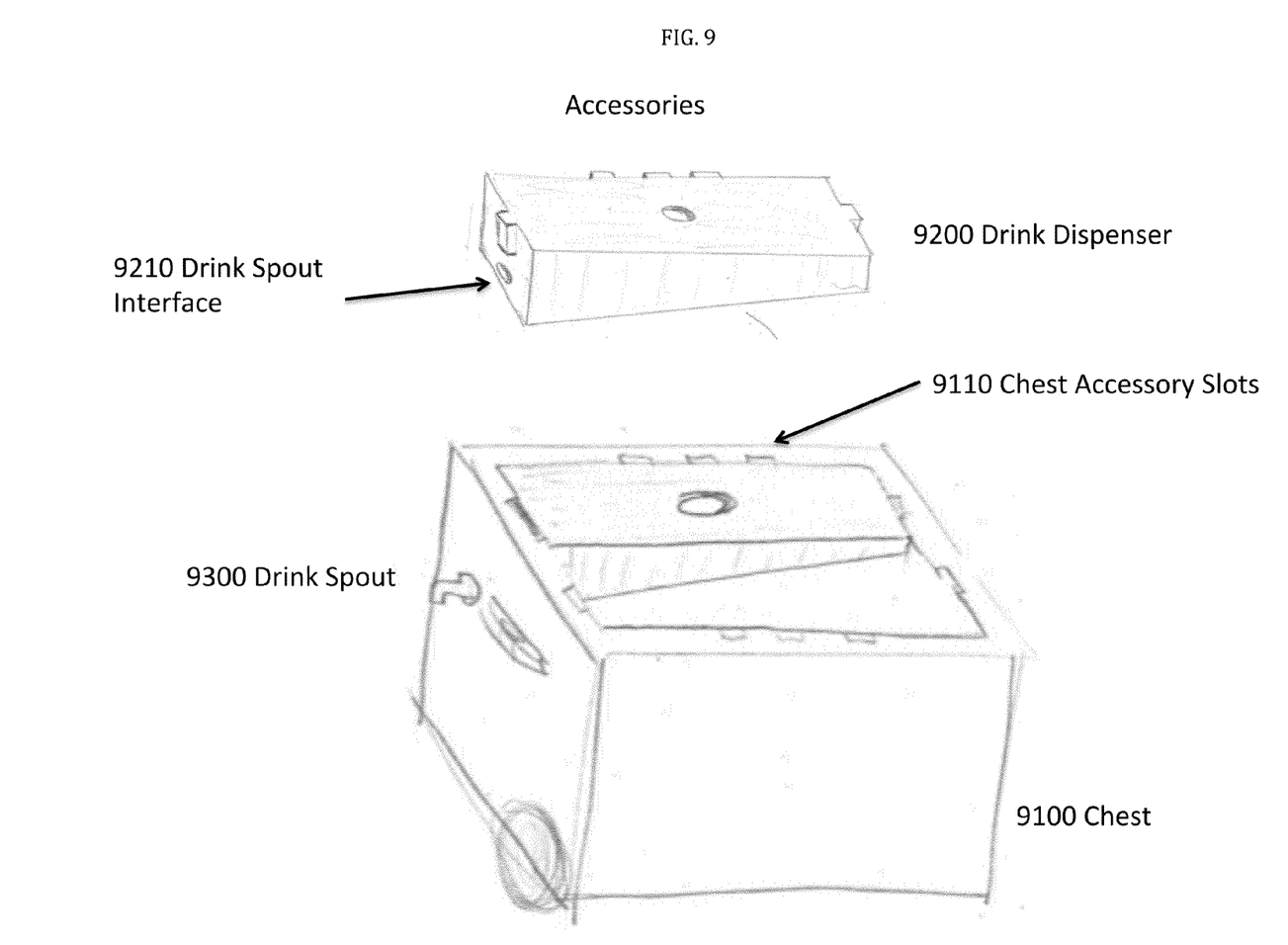
FIG. 9 is a figure illustrating accessories in accordance with the teachings of the present invention.

FIG. 9 shows a chest 9100 with a drink dispenser 9200 mounted inside of the chest 9100 via the accessory slots 9110. In this configuration, the chest 9100 may include a drink spout 9300 mounted through the sidewall of the chest. The drink dispenser 9200 includes a drink spout interface 9210 that mates with the drink spout 9300, such as a foil seal that is punctured to allow the drink fluid to flow through the drink spout 9300. The shape of the drink dispenser 9200 is designed such that the fluid will flow easily to the spout interface 9210 and drink spout 9300. For example, the bottom surface of the drink dispenser 9200 may be slanted to favor the flow of fluid to the spout interface 9210 and drink spout 9300.

Figure 10:
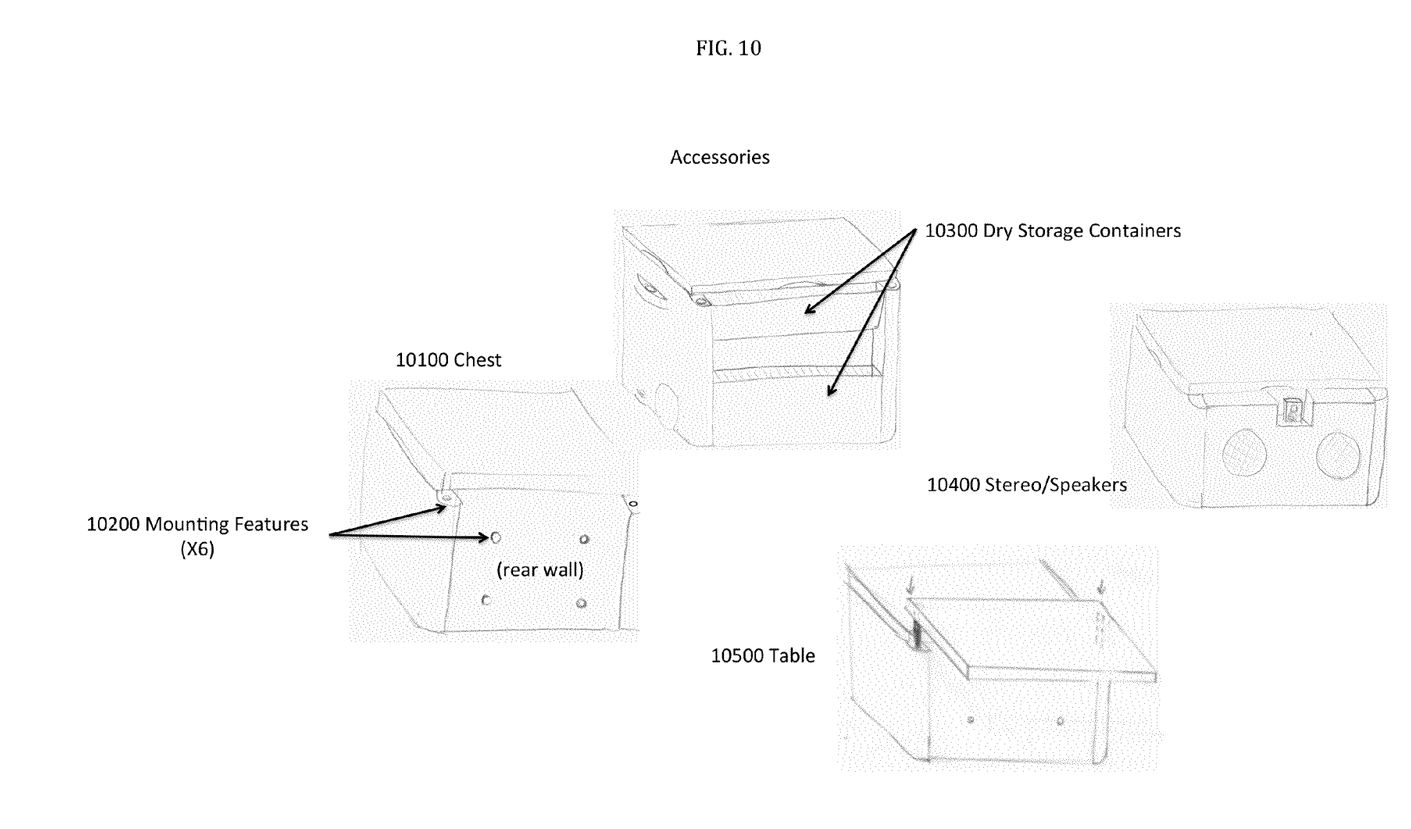
FIG. 10 is a figure illustrating accessories in accordance with the teachings of the present invention.
Figure 11:
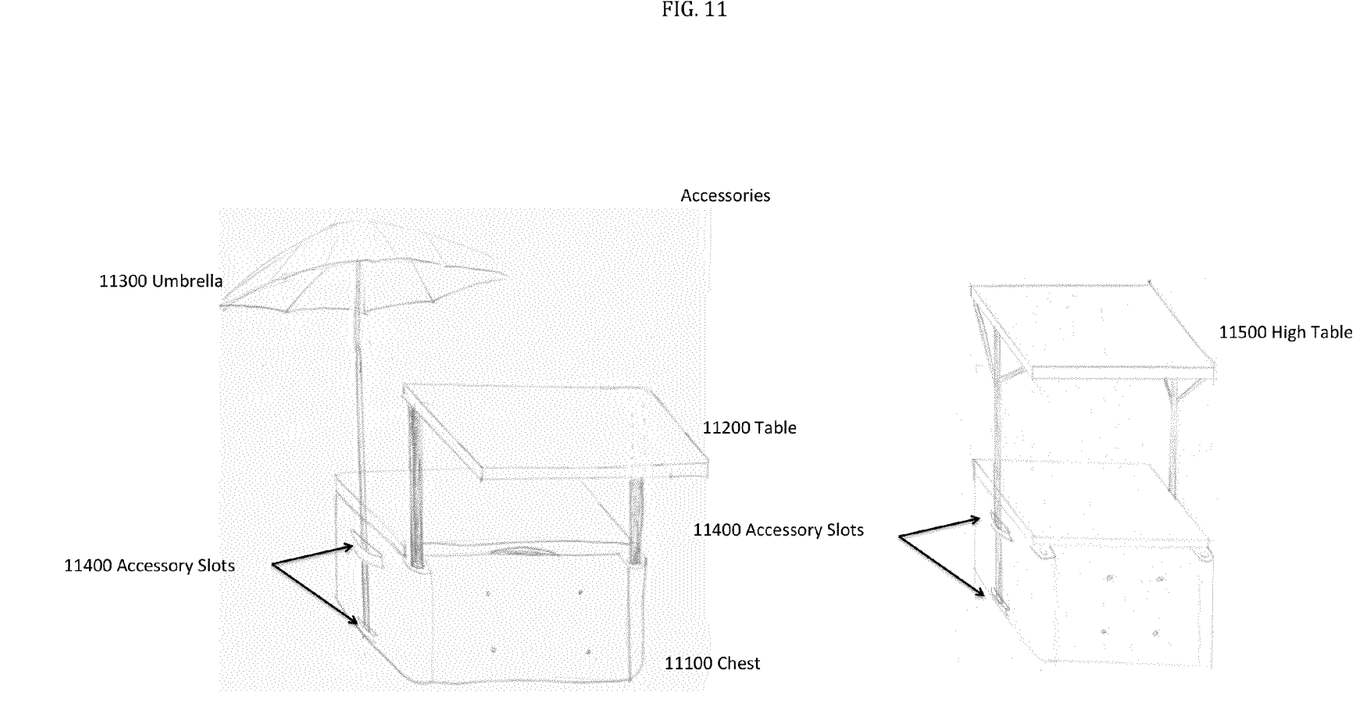
FIG. 11 is a figure illustrating accessories in accordance with the teachings of the present invention.

FIG. 10 shows the chest 10100 with accessory mounting features 10200. The accessory mounting features 10200 may be used to mount various accessories such as dry storage containers 10300, stereo speakers 10400, and table 10500. FIG. 11 shows accessory slots 11400 on the sidewall of the chest 11100. The accessory slots 11400 are designed in such a way to be stably attached to the chest such as molded into the sidewalls. Additional accessories may be used via the accessory slots 11400 such as an umbrella 11300 and high table 11400.

Figure 12:
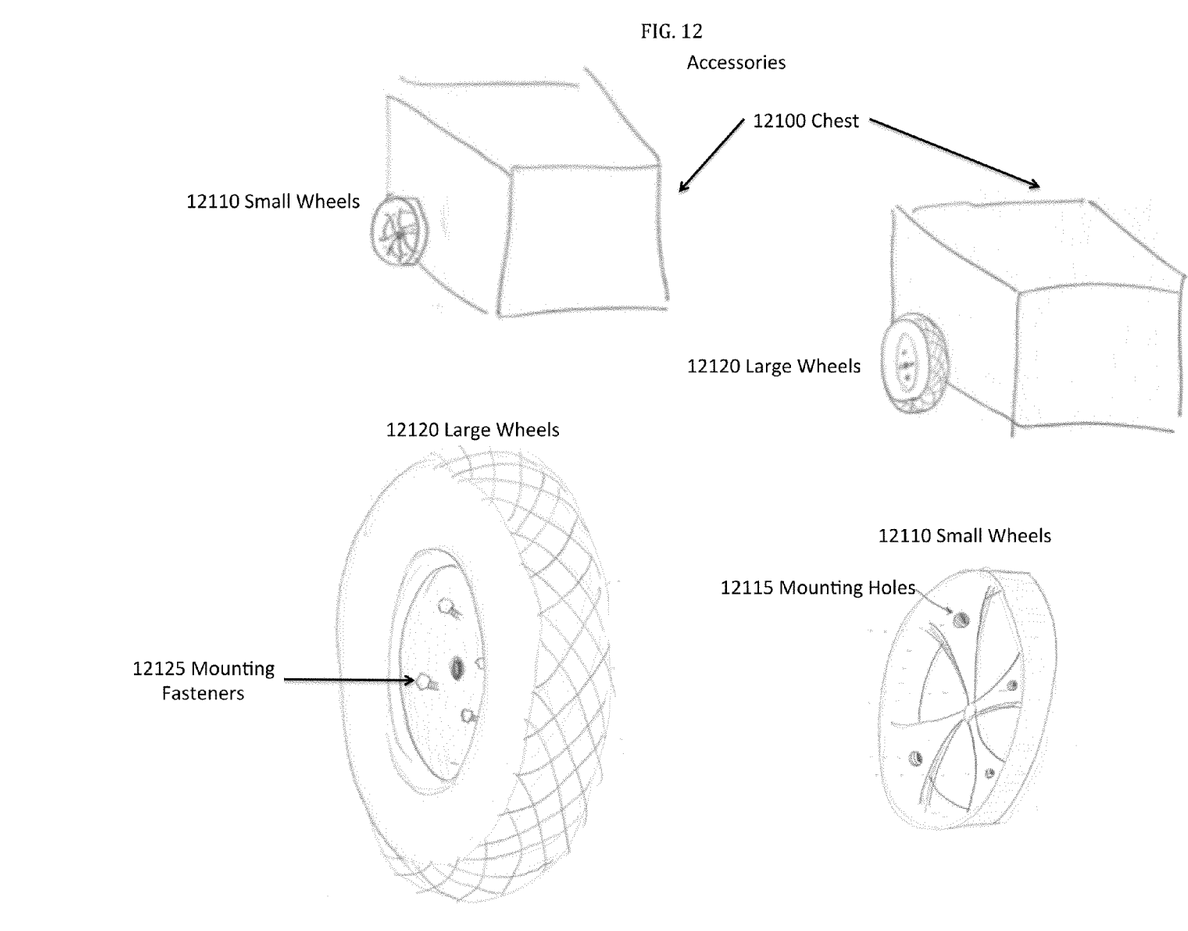
FIG. 12 is a figure illustrating accessories in accordance with the teachings of the present invention.

FIG. 12 shows the chest 12100 with small wheels 12110 attached. The small wheels include mounting holes 12115. The larger wheels 12120 may be attached to the small wheels 12110 via the mounting fasteners 12125. The larger wheels 12120 increase the clearance height for the cart assembly, as well as increase the load carrying capacity of the cart.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A configurable cart assembly comprising:
   a chest compartment;
   a first end of a telescoping support beam coupled to a front wall of the chest compartment;
   a second end of the telescoping support beam fixed to a rear surface of an extension member;
   a first edge of a cargo platform attached to the front wall of the chest compartment;
   a second edge of the cargo platform attached to the extension member;
   wherein, the cargo platform is comprised of at least a first plate coupled to the chest compartment and a second plate coupled to the extension member in such a way that the first plate and the second plate fold and unfold in an accordion style;
   a first end of a first telescoping support rail attached to a left wall of the chest compartment;
   a first end of a second telescoping support rail attached to a right wall of the chest compartment;

a second end of the first telescoping support rail attached to a left side of the extension member; and a second end of the second telescoping support rail attached to a right side of the extension member.

2. The cart assembly of claim 1, wherein the cargo platform can be configured into a table when the cargo is unloaded from the platform.

3. The cart assembly of claim 1, wherein the chest compartment is a rectangular box shape comprising the front wall, a rear wall, the right wall, the left wall, and a bottom wall configured to create at least one storage compartment.

4. The cart assembly of claim 3, wherein the storage compartment comprises a top wall that is attached by a hinge to at least one of the front wall, the rear wall, the right wall, or the left wall to form a lid that covers the storage compartment.

5. The cart assembly of claim 1, wherein the first telescoping support rail is coupled to the right wall of the chest compartment via a slot in the right wall such that the first telescoping support rail is inserted into the slot so the majority of the first telescoping support rail can be stowed inside of the slot when the cargo platform is in a retracted position, and such that the first telescoping support rail is allowed to slide freely within the slot but not allowed to separate from the chest compartment.

6. The cart assembly of claim 1, wherein at least one wheel is attached to the bottom wall of the chest compartment with a small wheel comprising at least one mounting hole on a side surface of the wheel wherein a larger wheel may be attached to the small wheel via the mounting hole.

7. The cart assembly of claim 1, wherein the first end of the telescoping support beam is coupled to an exterior surface of the front wall of the chest compartment via a slot in the bottom wall of the chest compartment such that the telescoping support beam is inserted into the slot so a majority of the telescoping support beam can be stowed inside of the slot when the cargo platform is in the retracted position, and so the telescoping support beam is allowed to slide freely within the slot but not allowed to separate from the chest compartment.

8. The cart assembly of claim 1, wherein the telescoping support beam is comprised of at least two members and the cross section of the members are comprised of hollow tubes, such that a smaller sized member can be collapsed within a hollow section of a larger sized member.

9. The cart assembly of claim 1, wherein an overall size of the telescoping support beam is designed to collapse and fit completely within the slot at the bottom wall of the chest compartment and to expand long enough to support the cargo platform when the cargo platform is in a fully expanded configuration.

10. The cart assembly of claim 1, wherein the length of each the first plate and the second plate is approximately half the length of the cargo platform when the cargo platform is in the fully expanded configuration, with one end of the first plate attached by a first hinge to the front wall of the chest, and the opposite end of the first plate is attached by a second hinge to one end of the second plate, and the opposite end of the second plate is attached by a third hinge to the extension member.

11. The cart assembly of claim 1, wherein the first plate and the second plate are coupled to the chest compartment and the extension member in such a way that the first plate and the second plate will fold in an accordion style, when the extension member is pushed toward the chest compartment.

12. The cart assembly of claim 1, wherein the first plate and the second plate unfold when the extension member is pulled away from the chest compartment to form the cargo platform with the first plate and the second plate laying flat against the telescoping support beam.

13. The cart assembly of claim 1, wherein the first plate attached to the chest compartment, is further comprised of a bottom plate and a top plate hinged together at an edge opposite the chest compartment, with an opposite ends of the bottom plate and the top plate not attached to each other, so an unattached opposite end of the top plate can rotate at least 180 degrees away from the bottom plate to form a tabletop when the cart is in the collapsed position.

14. The cart assembly of claim 1, wherein left wall and the right wall of the chest compartment each include a slot that interfaces with the first telescoping support rail and the second telescoping support rail, respectively, with the telescoping support rails inserted into each slot so that a majority of the telescoping support rails are stowed inside of each slot when the cargo platform is in the collapsed position, the telescoping support rails allowed to slide freely within each slot, but prevented from separating from the chest compartment.

15. The cart assembly of claim 1, wherein each of the first telescoping support rail and the second telescoping support rail are comprised of at least two members, each member comprised of hollow tubes, such that a smaller sized member can be collapsed within a hollow section of a larger sized member.

16. The cart assembly of claim 15, wherein the overall size of each of the first telescoping support rail and the second telescoping support rail are designed to collapse and fit within slots in the left wall and right wall, respectively, of the chest compartment and to expand long enough to match the length of the cargo platform when the cargo platform is in the fully expanded configuration.

17. The cart assembly of claim 1, wherein the first telescoping support rail and the second telescoping support rail are designed so they extend when the extension member is pulled away from the chest compartment, and collapse when the extension member is pushed toward the chest compartment.

18. The cart assembly of claim 1, wherein at least one wheel is attached to a bottom surface of the extension member with a small wheel comprising at least one mounting hole on a side surface of the wheel wherein a larger wheel may be attached to the small wheel via the mounting hole.

19. The cart assembly of claim 1, wherein the cart assembly includes accessories comprising at least one of accessory slots on the inside surface of the chest sidewalls, chest dividers used to separate the chest compartment into several isolated vertical compartments, small chest bins, large chest bins, a drink dispenser mounted inside of the chest via the accessory slots with a drink spout mounted through the sidewall of the chest, dry storage containers, stereo speakers, and table.

* * * * *